(12) United States Patent
Gao

(10) Patent No.: US 11,207,624 B2
(45) Date of Patent: Dec. 28, 2021

(54) HIGH PERFORMANCE MEDIA FOR FILTRATION AND OTHERS APPLICATIONS

(71) Applicant: Qiong Gao, Edina, MN (US)

(72) Inventor: Qiong Gao, Edina, MN (US)

( * ) Notice: Subject to any disclaimer, the term of this patent is extended or adjusted under 35 U.S.C. 154(b) by 0 days.

(21) Appl. No.: 16/051,331

(22) Filed: Jul. 31, 2018

(65) Prior Publication Data

US 2019/0030473 A1    Jan. 31, 2019

Related U.S. Application Data

(60) Provisional application No. 62/539,455, filed on Jul. 31, 2017.

(51) Int. Cl.
| | | |
|---|---|---|
| *B01D 39/18* | (2006.01) | |
| *B01D 39/20* | (2006.01) | |
| *B01D 39/16* | (2006.01) | |

(52) U.S. Cl.
CPC .......... *B01D 39/18* (2013.01); *B01D 39/163* (2013.01); *B01D 39/2024* (2013.01); *B01D 2239/0485* (2013.01); *B01D 2239/0492* (2013.01); *B01D 2239/0622* (2013.01); *B01D 2239/0636* (2013.01); *B01D 2239/1216* (2013.01); *B01D 2239/1233* (2013.01); *B01D 2239/1258* (2013.01); *B01D 2239/1291* (2013.01)

(58) Field of Classification Search
USPC .......... 428/299.7, 299.4, 191; 210/504, 505, 210/767; 55/527; 442/347; 162/107, 162/129, 130, 123
See application file for complete search history.

(56) References Cited

U.S. PATENT DOCUMENTS

| | | | | |
|---|---|---|---|---|
| 5,167,765 A * | 12/1992 | Nielsen | ...................... | D01F 8/06 162/146 |
| 7,732,047 B2 * | 6/2010 | Kashikar | ............... | C09D 151/06 428/392 |
| 9,474,994 B2 * | 10/2016 | Gao | ...................... | B01D 39/163 |
| 10,357,730 B2 * | 7/2019 | Gao | ...................... | B01D 46/521 |
| 2001/0040136 A1 * | 11/2001 | Wei | ...................... | B01D 39/1607 210/767 |
| 2006/0096932 A1 * | 5/2006 | Dema | .................. | B01D 39/163 210/767 |
| 2015/0157969 A1 * | 6/2015 | Sealey | ............... | B01D 39/2017 55/485 |
| 2016/0136553 A1 * | 5/2016 | Healey | ............... | B01D 39/2017 55/486 |
| 2017/0312671 A1 * | 11/2017 | Shim | ...................... | B01D 39/18 |

* cited by examiner

*Primary Examiner* — Nina Bhat

(57) ABSTRACT

A high performance media for filtration and other applications uses specially designed binder fibers, wherein the filter media uses higher strength binder fibers to provide the media with high efficiency, high permeability, and high dirt holding capacity while also providing higher strength and stability during process and use.

17 Claims, 7 Drawing Sheets

HIGH PERFORMANCE MEDIA FOR FILTRATION AND OTHERS APPLICATIONS

CROSS-REFERENCES TO RELATED APPLICATIONS

This application claims the benefit of U.S. Provisional Patent Application Ser. No. 62/539,455, entitled "High Performance Media for Filtration and Others", filed Jul. 31, 2017 the contents of which is herein incorporated by reference in its entirety.

STATEMENT REGARDING FEDERALLY SPONSORED RESEARCH OR DEVELOPMENT

Not Applicable.

PARTIES TO A JOINT RESEARCH AGREEMENT

Not Applicable

FIELD OF THE INVENTION

The field of the invention is in media materials and processes for high performance filtration.

BACKGROUND OF THE INVENTION

It is desirable to have strong, high efficiency, high permeability and high dirt holding capacity media for high performance filtration. Existing high efficiency media such as wetlaid media often use resin binder to bind fibers together in a media structure. In the resin-bonded fibrous media, the resin can often bridge and form webs across gaps between fibers, and small pores can often be blocked resulting in reduced permeability, reduced efficiency and lower dirt holding capacity (DHC). These problems can often cause greater difficulty when resin-bonding is used with small media fibers in high efficiency media. Other types of high efficiency wetlaid media employ synthetic polymer binder fibers which are either mono- or bicomponent synthetic fibers or both for different applications. In these media, the polymer in the binder fiber melts to bond fibers to fibers in the media structure. The use of synthetic bicomponent fibers for use in filtration media is disclosed in U.S. Pat. Nos. 5,167,765, 5,580,459 and in U.S. Pat. No. 7,309,372, the contents of which are incorporated by reference in their entirety. However, use of synthetic polymer binder technology in high efficiency applications has limitations. Although the efficiency of the media can be increased by using smaller diameter fibers, the strength of the synthetic binder fiber decreases as the diameter of the fibers gets smaller, which weakens the overall strength and resilience of the filtration media. Larger synthetic binder fibers have limited binding points with smaller fibers in a media structure which is especially a problem in high efficiency media that uses large amount of small media fibers. Non-bonded fibers in the media reduce the internal media strength and also cause media shedding issues. If the synthetic binder fiber size is reduced to say below 10 um or 5 um, its strength and dispersion in the fiber blend during media manufacture can be problematic.

The use of binder fiber provides advantages for high performance media, but the current technology using synthetic bicomponent fiber is limited by the fiber size as small synthetic fiber does not have enough strength and is difficult to make and disperse within the fiber blend while large synthetic binder fibers offer limited contact points resulting in stability and fiber shedding issues during further process and use of the media. The small media fibers (often glass fibers) which are not bonded tend to move during processing and use causing the stability issues with media performance. The glass fiber shedding also causes secondary contamination during use which a big concern during filtration. Small yet strong binder fibers to provide more contact points for resulting media strength and improvements in filtration performance and stability would be useful. Special surface modification and functionalization processes to enable the use of glass fibers as bonding fibers would be useful, whether during the fiber manufacturing process or the media manufacturing process.

SUMMARY OF THE INVENTION

This invention is directed towards high performance media for filtration and other applications using specially designed binder fibers, wherein the filter media uses higher strength binder fibers to provide the media with high efficiency, high permeability, and high dirt holding capacity while also providing higher strength and stability during process and use. The designed media can be used in air and liquid filtration and separation, and other applications where high permeability, small pore sizes, and high holding capacity are desired.

DETAILED DESCRIPTION OF THE INVENTION

Figure 1:
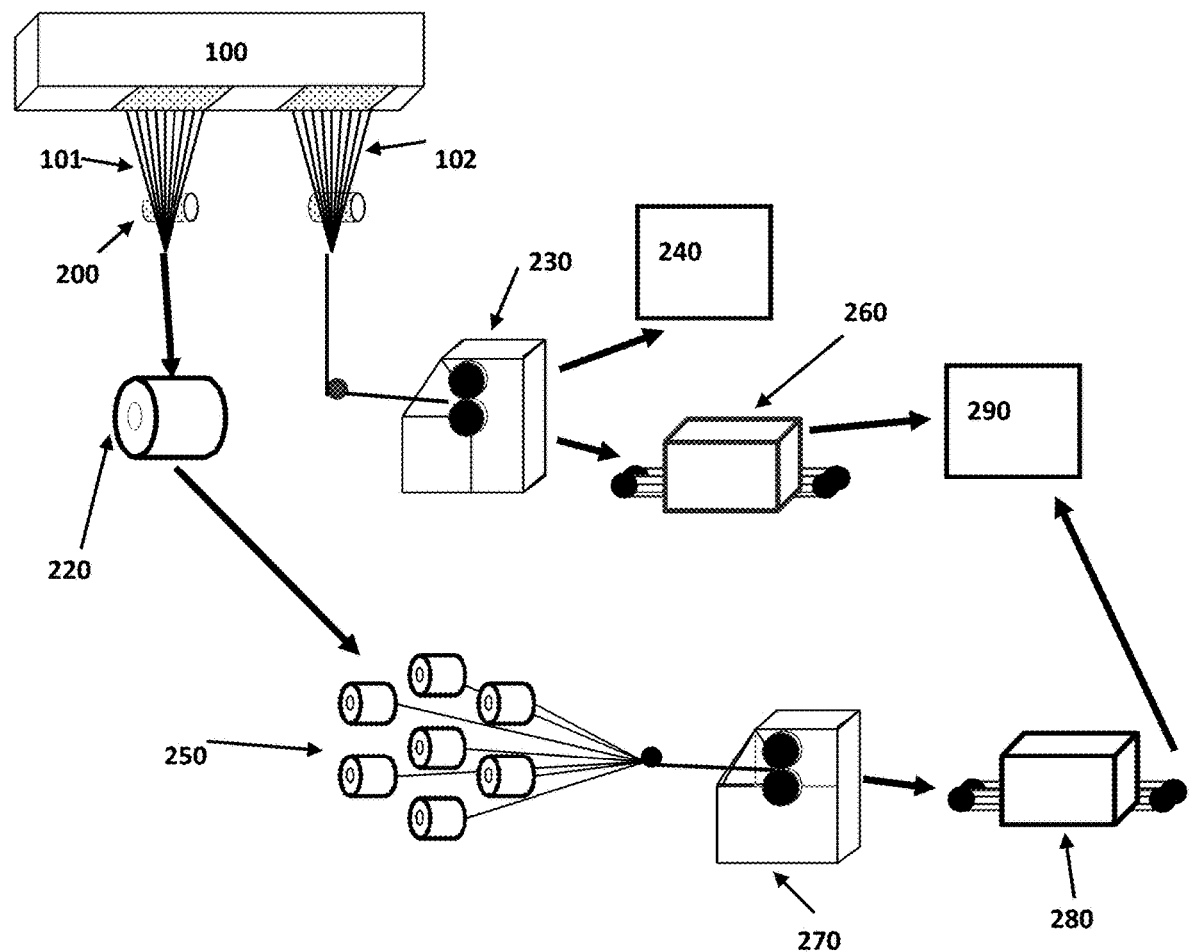
FIG. 1 is a drawing showing an example of a continuous filament process.

In embodiments of the invention, specially designed binder fibers are combined with other fibers to produce high performance media for filtration and other applications. The media have high efficiency, high permeability, high dirt holding capacity and stability during further process and use. The designed media can be used in air and liquid filtration and separation, and other applications where high permeability, small pore sizes, and high holding capacity are desired. The specialty binder fibers have small fiber diameters to allow more binding sites but are made of higher strength materials to allow the resulting media to have high filtration performance, maintain the media pore structure under flow and pressure conditions in use, and have enough internal media strength for handling. In addition, due to the improved bonding the media has less or no glass/inorganic short staple fiber shedding. In a filter media, a plurality of the specialty binding fibers can be bonded to a plurality of the media fibers. The fibers can comprise a material or coating that improves their dispersion in water and other aqueous solutions. In an embodiment of the invention, the specialty binder fibers can have a range of fiber diameters from 10 microns down to 0.1 microns, preferably from 5 microns to 0.2 microns. In an embodiment, the specialty binder fiber is preferably rigid to provide the media temperature media with integrity to withstand environmental temperature and humidity conditions, even in a high-temperature rigorous environment. Suitable specialty binder fibers can comprise resin-coated inorganic fiber such as staple glass and microglass fiber. The resin content can be between 0.05-25% by weight.

Media fibers are fibers that can aid in filtration or in forming a structural media layer. Such fiber can be made from a number of both hydrophilic, hydrophobic, oleophilic, and oleophobic fibers. These fibers cooperate with the specialty binder fiber to form a mechanically stable, but strong, permeable filtration media that can withstand the mechanical stress of the passage of fluid materials and can maintain the loading of particulate during use. Such fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers. Media fibers can also include glass fibers. In an embodiment, the media can include media fibers for improving filtration and separate media fibers that are added to increase the tensile and burst strength of the materials in dry and wet conditions, or to improve the heat resistance of the media. Additionally, the media fiber can include binder fibers made from such polymers as polyvinyl chloride and polyvinyl alcohol. The media fibers can also include inorganic fibers such as carbon or graphite fiber, metal fiber, ceramic fiber and combinations thereof.

Thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid.

Resin used as binder can be in the form of water soluble or dispersible polymer added directly to a fiber blend dispersed in a solution or in the form of thermoplastic binder fibers of the resin material intermingled with the specialty binder and media fibers to be activated as a binder by heat applied after the sheet is formed. Resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. In some instances the preferred materials for water soluble or dispersible binder polymer are water soluble or water dispersible thermosetting resins such as acrylic resins, methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, polyamide resins, that are in common use in the papermaking industry. Such binder resins typically coat the fiber and adhere fiber to fiber in the final non-woven matrix. The resin can be added to the furnish during papermaking or can be applied to the media after formation. Other suitable resins include acrylic polymer, methacrylic polymer, vinyl acetate polymer, vinyl chloride polymer, polyvinyl alcohol, polyvinyl acetate, polyvinyl acetyl, polyamide, polyethylene vinyl acetate copolymer, urea phenol resin, urea formaldehyde resin, melamine resin, epoxy resin, polyurethane, curable unsaturated polyester, polyaromatic resins, or resorcinol resins, or mixtures thereof.

The inorganic fiber used in the specialty binder fiber can use inorganic fibers such as glass, ceramic, or metal fibers. A preferred material for use in the specialty binder fibers is glass. Glass fibers have several properties that can make them useful in filtration, acoustic, and insulation application. Glass fibers can withstand relatively high temperatures without degradation. For filter media, glass fibers can add surface area to capture particles; glass fibers typically have a surface area of 0.05 to 15 square meters per gram. Multiple glass fibers in a media structure can provide a tortuous path for particles, which can be beneficial for solid and liquid filtration. Glass is also a relatively inexpensive materials and fibers can be produced in large quantities. For example, a large glass wool manufacturing facility can produce over 2000 square meters per second (up to 170 square kilometers per year).

Glass fibers can be produced as continuous filaments which can be chopped to form individual fibers, or they can be produced as discontinuous fibers such as glass wool. Typical properties and applications for both types of glass are shown in Table 1.

TABLE 1

Example Glass Materials

| | Continuous Filament | Glass Wool (Discontinuous) |
|---|---|---|
| Processing | Pulled in a continuous filament parallel with other strands (often chopped downstream | Process inherently creates discontinuous sections of fiber that have somewhat random orientation |
| Typical Fiber Diameters | 4-30 micron | 0.2 to 10 micron |
| Glass Types | E-glass, C-glass, R-glass, S-glass, AR-glass, A-glass, D-glass, basalt, others | Soft alkali borosilicates, mineral wool, modified slag & basalt, RCF, others |
| Uses | Reinforcement (chopped fiber, rovings, wovens, non-wovens) filtration, separation, facers, thermal insulation, fireblocking | Thermal insulation (blanket, board, pipe, paper), acoustic insulation, filtration, separation |

Figure 2:
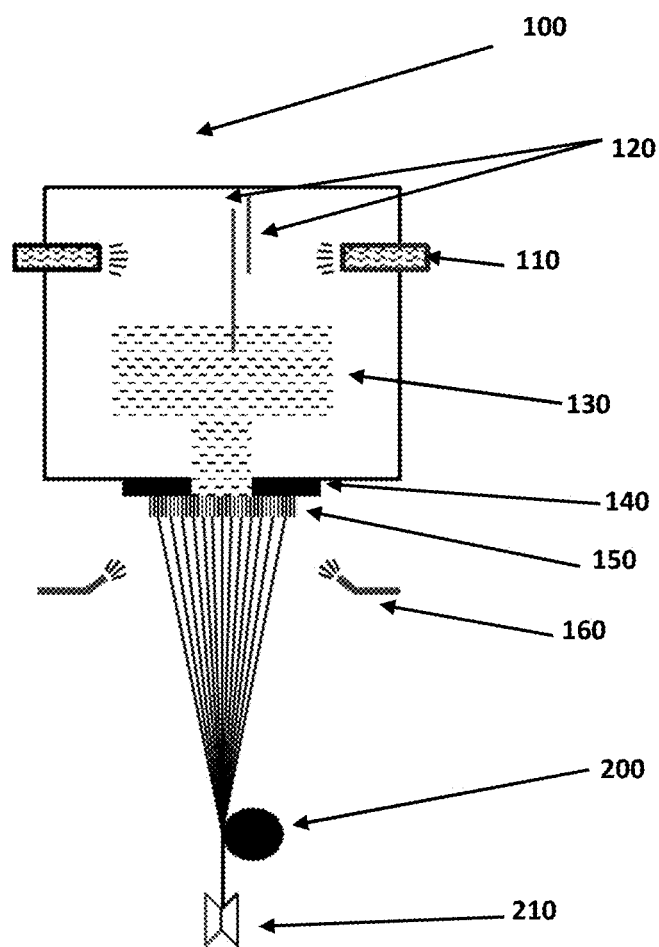
FIG. 2 is a drawing showing additional components of the continuous filament process.

In embodiments, the staple glass fiber can be produced by a continuous filament process. In the continuous filament process shown in FIG. 1 and FIG. 2, glass melt in apparatus 100 exits as glass fiber streams 101 and 102 that can be processed in different ways. Fibers in streams 101 and 102 have a coating applied to them by a sizing/coating applicator 200. The coated fibers in stream 101 can then be wound up on winder 220 for future processing while fibers in stream 102 can be processed through a chopper to produce wet chopped strand 240 containing approximately 7-18% water by weight and 1 to 20% coating solids. The wet chopped strand 240 can then be processed through a dryer 260 to produce dry chopped strand 290 containing a water content by weight of less than 5% and 2 to 30% coating solids. Multiple rolls 250 of wound fibers from fiber stream 101 can also be fed to chopper 270 and processed through dryer 280 to also produce dry chopped strand 290. FIG. 2 shows additional details for apparatus 100. Apparatus 100 comprises a burner 110 for providing heat to the system, thermocouples 120 to measure heat, and a glass melt 130. The glass melt 130 flows through flow block 140 and bushing 150 to form a stream of molten glass strands which can pass through a water spray 160 before being coated using sizing/coating applicator 200. Guide pulley 210 can be used to collect the coated fibers and direct them into chopper 230 (shown in FIG. 1). The modified resin emulsion/solution containing coupling agent and modified resin (e.g. polyester or polyamide resin) can be applied after fiber formation, and coat the fiber surface to form a coating layer containing coupling agent and resin.

The coupling agent, typically a silane, and, in particular, an amino-silane, can include functional groups that include at least one group that is reactive with a fiber surface and at least one second group that is reactive with the modified polyolefin. Although the composition is not so limited, for most silanes these functional groups tend to be hydrophilic and usually soluble in water. The hydrophilic coupling agent improves the adhesion between the reinforcing fiber material and the polymer matrix resin that is being reinforced. In an embodiment, an aminosilane coupling agent used is Union Carbide's A-1100, a γ-aminopropyltriethoxysilane. Examples of silanes having functional groups other than amino functional groups include, but are not limited to: vinyltrimethoxysilane (commercially available as A-171), glycidyloxypropyltrimethoxysilane (commercially available as A-187), and methacryloxypropyltrimethoxysilane (commercially available as A-174), all of which are available from GE Osi Specialties, Inc.

In addition to the hydrophilic coupling agent discussed above in which each of the functional groups exhibits a definite polar nature, the fiber size composition can also include a hydrophobic coupling agent in which at least one of the functional groups exhibits a decidedly non-polar (hydrophobic) nature. A typical hydrophobic coupling agent can be a silane that may be represented by the general formula $R_n$—Si—$Y_{4-n}$, where R is an alkyl group, such as a methyl, ethyl, propyl or butyl group, a straight-chain or branched alkyl group, or a straight-chain or branched unsaturated carbon group. The value of n may be from 1 to 3, with a value of 1 being preferred. Suitable hydrophobic coupling agents include propyltrimethoxysilane or propyltriethoxysilane and vinyltrialkoxysilane.

The resin can comprise a modified thermoplastic or curable thermoset resin. Example thermoplastic or thermoset compounds include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. The preferred materials for the water soluble or water dispersible thermosetting resins such as acrylic resins. methacrylic resins, polyamide resins, epoxy resins, phenolic resins, polyureas, polyurethanes, melamine formaldehyde resins, polyesters and alkyd resins, generally, and specifically, water soluble acrylic resins. methacrylic resins, polyamide resins, and mixtures. The coated fiber strands can be chopped into staple fiber after coating and collected for further processing as specialty binder fibers, such as in a wetlaid process to form fibrous sheet.

Figure 3:
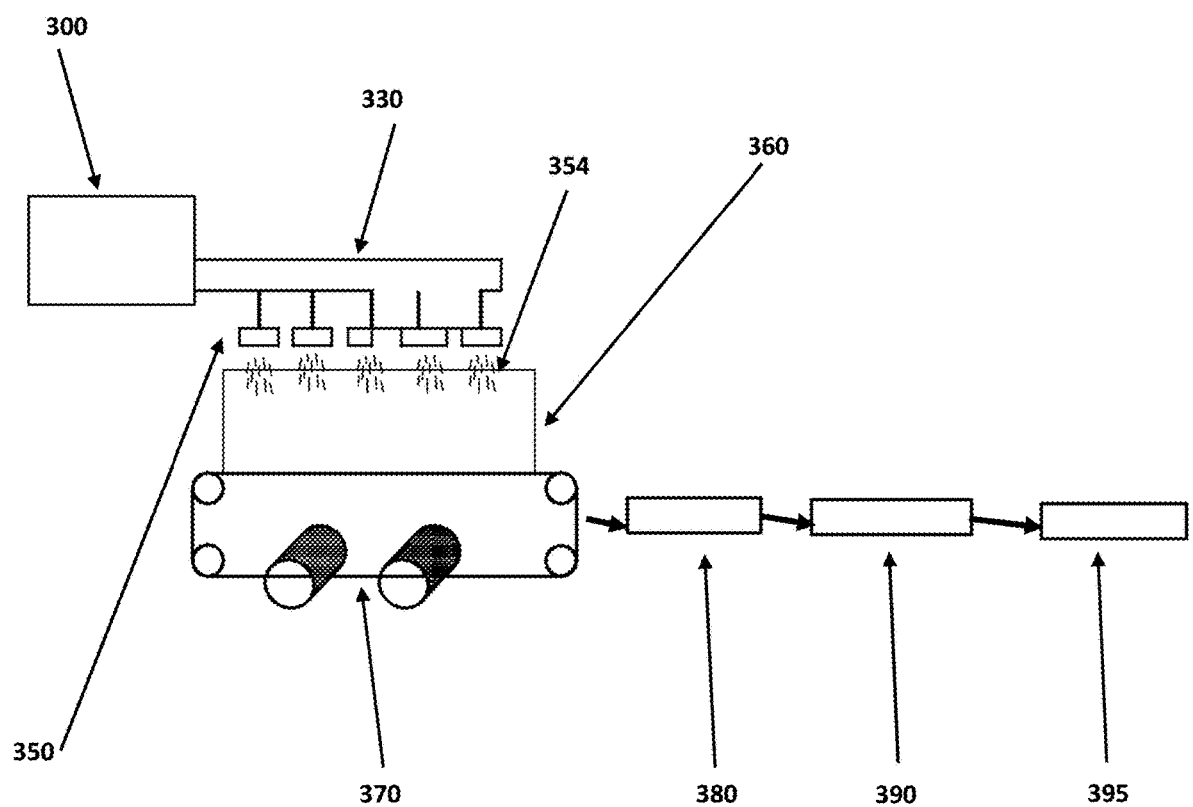
FIG. 3 is a drawing showing an example of a rotary fiberization process.
Figure 4:
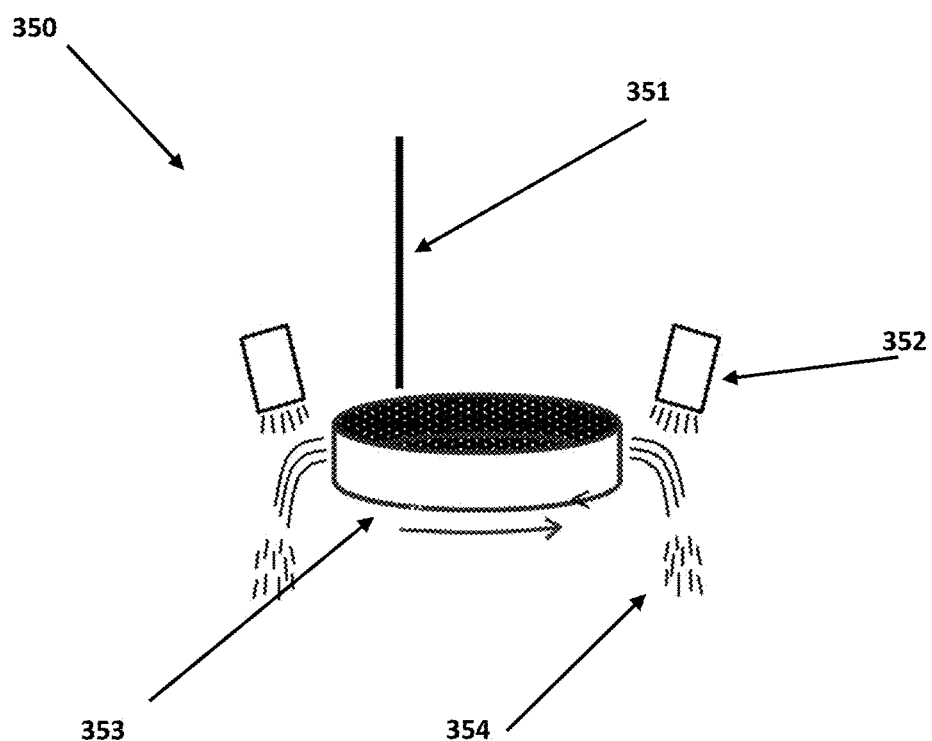
FIG. 4 is a drawing showing additional components of the rotary fiberization process.

In embodiments, the resin coated microglass fiber can be produced by rotary fiberization process. In the rotary fiberization process shown in FIG. 3 and FIG. 4, fibers are melted in melter 300, typically using a direct melt process with gas or electric melters. The melt then flows into forehearth 330 for melt conditioning which can range from full forehearth to simple diverter troughs and small holding vessels. After the melt has been properly conditioned, the melt flows into rotary fiberizers 350 located below forehearth 330. FIG. 4 illustrates additional details for the fiberizers 350. In FIG. 4, melt stream 351 flows into the fiberizer 350. The fiberizer 350 comprises attenuation heaters 352 and a spinner 353. Melt flows through openings in the walls of spinner 353 and exits as fiber stream 354. In FIG. 3, fiber stream 354 is coated below the fiberizers 350 with a 2 to 30% coating by weight. Coated fibers can then be collected in collection box 360 which collects the fibers on a chain or drums 370; suction can be used to remove water from the fiber collected on the chain or drum. The process can use one or more collection boxes. Collection boxes can contain 1 to 10 fiberizers per box. Air lappers can be used to distribute fiber within the collection box. After the coated fibers are fiberized, they can go through milling apparatus 380 and conditioning apparatus 390 to produce loose fill fiber. Fiber can then go through packaging apparatus 395 where it is packaged as bales, rolls, or other suitable forms.

Figure 5:
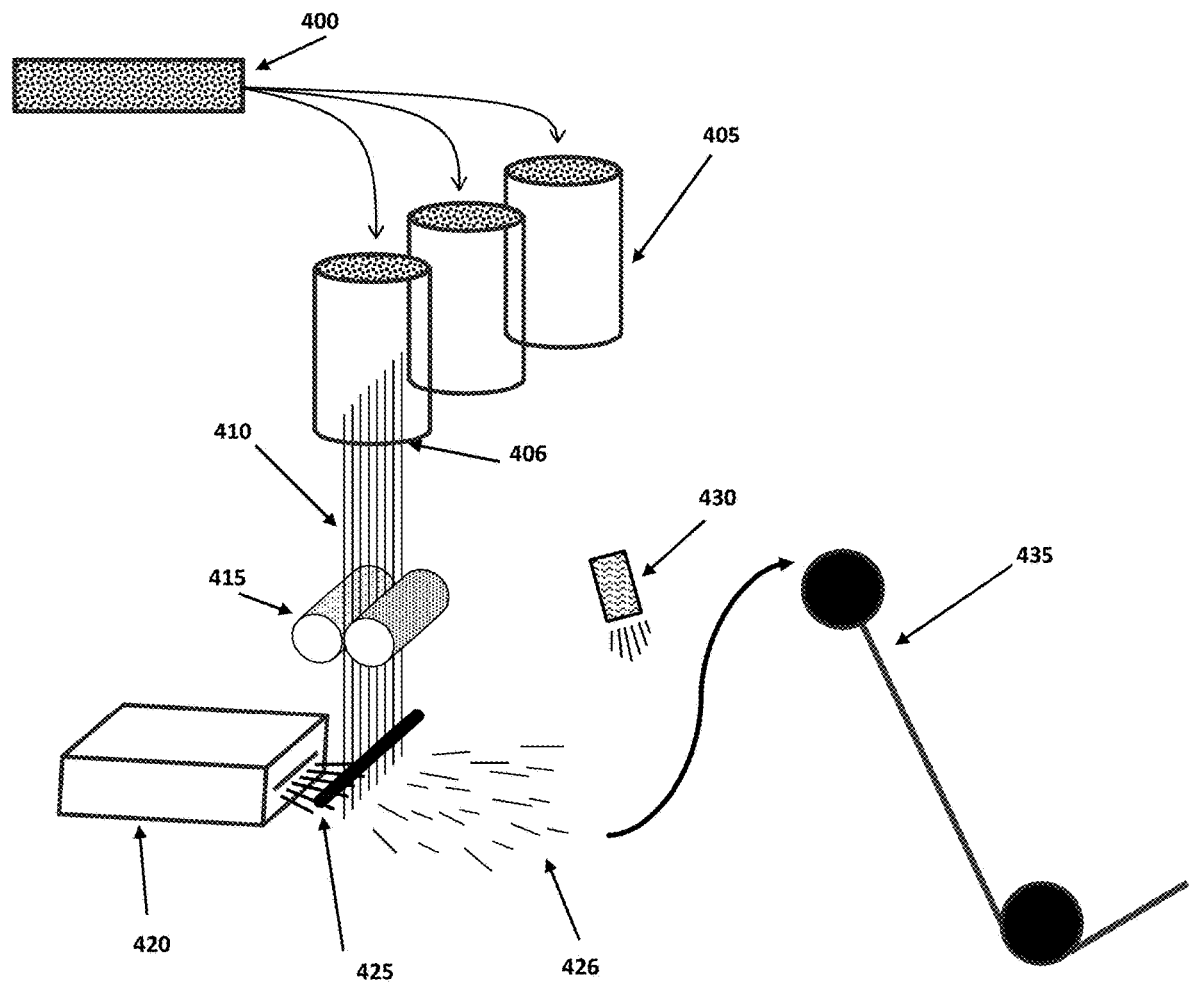
FIG. 5 is a drawing showing an example of a flame attenuation process.

In embodiments, the coated microglass fiber can be produced by flame attenuation process. In the process shown in FIG. 5, solid pieces of glass can be fed using marble feeder 400 to one or more collection boxes 405 to be melted down. Collection boxes can contain either gas-fired or electrical-powered heaters to produce the melt. The collection boxes can be used for either direct melt or for re-melt of the material from marble feeder 400. Direct melt requires less energy, but re-melt allows for flexible fiberization operations, such as more flexible start/stop procedures, glass composition changes, etc. One to ten pots or burners can be contained in each collection box. Melted glass flows through holes or tips 406 in the bottom of the boxes 450 to produce primary stream 410 of glass fibers with diameters of 0.1 to 1.0 mm. As shown here, pull rolls 415 can be used to control the speed of primary stream 410 as well as the diameter of the fibers in the stream. The fibers are directed from the pull rolls to a guide 425 where hot air from a burner 450 is used to contact the fiber stream to produce smaller individual fibers 426. The fibers 426 are then coated after contacting coating spray 430. A collection apparatus 435 is then used to collect the coated fibers. The collection apparatus is typically a chain or drum. This process can produce fibers with average diameters less than 150 nanometers.

In both the rotary fiberization process and the flame attenuation process, the resin can be applied after the fiber formation step (and often while fibers are still hot, so resin may melt and coat the surface evenly). Electrostatic Spray coating or a pressurized coating applicator can be used to apply resin coating. In an embodiment wherein a wetlaid process is used to manufacture the media, regular glass fibers and resin coated glass fibers are mixed in water, a small amount of synthetic binder fibers like polyvinyl alcohol and/or bicomponent synthetic polyester binder fiber can be added, and/or a small amount of binder resin can also be added to further enhance the sheet strength if necessary.

In an embodiment, a glass fiber can be coated by a functionalized cationically charged, silicon containing carbohydrate polymer, in which glass fibers pass through a solution of a functionalized cationic starch polymer under conditions sufficient to substantially coat the fibers. The functionalized cationic polymer can be crosslinked by heat. The coated glass fiber is used as specialty binder fiber with or without mixing with media fibers and other binder fibers, to form a web. Additional binder resin may be added after web formation, and then the resulting fibrous media/web is treated with heat at a temperature and for a time sufficient to crosslink the functionalized cationic polymer present on the glass fibers and activate other binder fibers and resin if included. Useful examples of functionalized cationic polymers include epichlorohydrin-functionalized polyamines and epichlorohydrin-functionalized polyamido-amines. Both types of polymers can be exemplified by the Kymene® resins which are available from Hercules Inc., Wilmington, Del. Other suitable materials include cationically modified silicon containing carbohydrates (starches), such as Redi-Bond, and Co-Bond™ 2500 from National Starch. Co-Bond™ 2500 has proven particularly useful as a cationic coating, as a result of its ability to crosslink intramolecularly without the need for a secondary crosslinking agent and its environmentally friendly attributes. Further, the use of a starch exemplified by Co-Bond™ 2500, is particularly effective as a cationic coating in that the charge group is available at the end of a long polymer chain, rather than being buried in the backbone of a polymer chain. The functionalized cationic polymer can be an epichlorohydrin-functionalized polyamine, an epichlorohydrin-functionalized polyamido-amine or cationically charged polysaccharides as exemplified by Co-Bond™ 2500. Additional coating species and methods can be found in US Patent Application US20010040136, the contents of which are incorporated by reference in their entirety.

Coating methods described above can be used to make binder fibers having special functions, such as positively or negatively charged surfaces. These special functions aid the filtration performance of the media, such as that shown in U.S. Pat. No. 4,523,995, in which the microglass fiber is coated with polyamine-epichlorohydrins resins. Suitable cationic thermosetting polymers or binder resins are those containing a substantial number of quaternary ammonium groups, derived from any suitable aliphatic amine which has been fully quaternized. Such binder resins produce filter sheets with a high cationic charge and can display enhanced particle removal from aqueous fluids over a broad pH range of from about 3 to about 10 due to their positive zeta potential over that range, a desirable characteristic of filter sheets prepared by the preferred process and using the preferred binder resins of this invention. Commercially available water soluble, non-colloidal cationic thermosetting binder resins of the polyamido/polyamino-epichlorohydrin class, which are preferred for purposes of this invention, are Kymene® 557 and the Polycup® series of resins manufactured by Hercules Incorporated.

Figure 6:
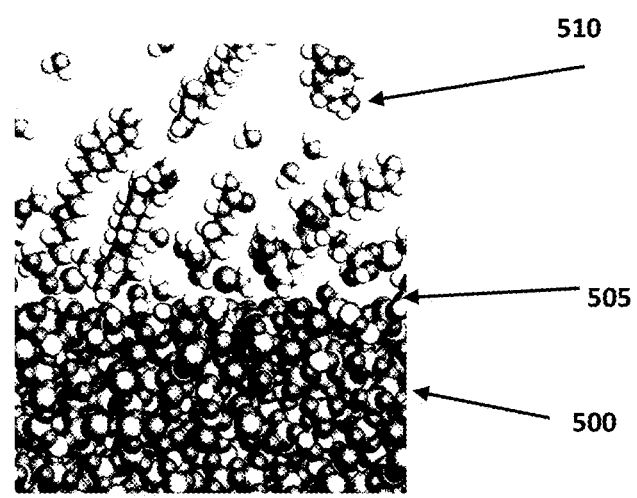
FIG. 6 is a drawing showing an embodiment of coating particles and glass fibers and the interface between them.

By providing the normally negative zeta potential microfibers with a positive zeta potential binder resin coating, substantially enhanced particulate removal efficiency for the microfiber filter sheet is obtained in liquid filtration. US 20010040136 also shows that a positively charged media has improved the particle removal efficiency compared with original negatively charged media. Additional binder fibers can be bicomponent fibers such low meltpoint polyester and polyester sheath-core structured fiber, PE/PP bico, and additional binder resins can be polyvinyl acetate (PVA), polyamide copolymer, etc. In an embodiment shown in FIG. 6, the coating solution can comprise coupling agent species to improve initial bonding and adhesion of the coating to the glass fiber. The coating particles 510 can include a coupling agent on their surface which improves their bonding to the glass fiber surface 500 as the coating particles approach the interface/coupling region 505 near the surface of the glass fiber.

In embodiments, the coating can comprise additional species including film forming agents, coupling agents, and other enhancers that may be added to improve desired properties around lubrication, wetting, hydrophobicity, interphase promotion, etc. The matrix resin used as the film forming agent can be selected from a wide variety of plastics including polyolefins, particularly polypropylene and polyethylene, polyesters, polyacetals, polyamides, polyacrylamides, polyimides, polyethers, polyvinylethers, polystyrenes, polyoxides, polycarbonates, polysiloxanes, polysulfones, polyanhydrides, polyimines, epoxies, polyacrylics, polyvinylesters, polyurethane, maleic resins, urea resins, melamine resins, phenol resins, furan resins, polymer blends, polymer alloys and mixtures of them.

The coupling agent typically includes functional groups that include at least one group that is reactive with a fiber surface and at least one second group that is reactive with the modified polyolefin. The hydrophilic coupling agent improves the adhesion between the reinforcing fiber material and the polymer matrix resin that is being reinforced. Without being bound by any particular theory, it is believed that the coupling agent forms a "bridge" between the glass fibers and the matrix resin when reactive functional groups on the coupling agent interact with functional groups on the surface of the fibers and/or the film-forming agent (the modified polyolefin) of the fiber size composition. Because the functional groups involved are typically polar in nature, the coupling agent tends to be hydrophilic and readily dispersed in an aqueous composition. A preferred aminosilane coupling agent is Union Carbide's A-1100, a γ-aminopropyltriethoxysilane. Examples of silanes having functional groups other than amino functional groups include, but are not limited to: vinyltrimethoxysilane (commercially available as A-171), glycidyloxypropyltrimethoxysilane (commercially available as A-187), and methacryloxypropyltrimethoxysilane (commercially available as A-174), all of which are available from GE Osi Specialties, Inc.XXXXX.

In addition to the hydrophilic coupling agent discussed above in which each of the functional groups exhibits a definite polar nature, the fiber size composition can also include a hydrophobic coupling agent in which at least one of the functional groups exhibits a decidedly non-polar (hydrophobic) nature. A typical hydrophobic coupling agent is a silane that may be represented by the general formula $R_n$—Si—$Y_{4-n}$, where R is an alkyl group, such as a methyl, ethyl, propyl or butyl group, a straight-chain or branched alkyl group, or a straight-chain or branched unsaturated carbon group. The value of n may be from 1 to 3, with a value of 1 being preferred. Suitable hydrophobic coupling agents include propyltrimethoxysilane or propyltriethoxysilane and vinyltrialkoxysilane.

In an embodiment, an enhancer component can be included to improve the interactions among the sizing ingredients and interaction of the sizing ingredients to the fiber and to the matrix resin thereby enhancing the fiber-matrix interphase. In an embodiment, an enhancer component can enhance the interface between the fiber and polymeric materials by providing a hydrophobic environment that discourages the degrading effects of water and moisture. In an embodiment, an enhancer component can provide an environment that reduces discoloration at the coating on the fibers as well as at the interface between the glass fiber and the matrix resin. Enhancer components can include boron-containing compounds, fluorine-containing compounds, fluoro-boro compounds, cyclic fatty acids, and combinations of at least two saturated fatty acids with one of those fatty acids having at least two acid groups. The enhancer components can also include at least one phosphorus or sulfur compound in which the phosphorus or sulfur is at its highest oxidation value, i.e., a P(V) and/or a S(VI) compound.

The composition of the coating can include a blend of at least two (that is, two or more) saturated fatty acids with one of the fatty acids having at least two fatty acid groups. As used here, the term "fatty acid" includes, besides C8-C40 alkyl chain fatty acids, also the lower alkyl acids such as succinic, propionic and butyric acid. In an embodiment, the blend of saturated fatty acids can serve as a lubricant that protects the fibers from breakage and shear stress. Also, it will generally reduce damage to the filaments during fiber production, handling and manufacturing ensuring better material performance. In an embodiment, the fatty acid blend also acts as a wetting agent providing better coverage of the fiber filaments by coating composition during manufacturing production.

Example coating formulations are shown in Table 2, using data from U.S. Pat. No. 7,732,047 which is incorporated by reference in its entirety.

TABLE 2

Example Coating Formulations

| | Example 1 | Example 2 | Example 3 |
|---|---|---|---|
| Modified PET, PA, or PP Emulsion | 40.71 | 43.00 | 43.00 |
| Aminopropyltriethoxysilane | 5.70 | 5.69 | 5.69 |
| Saturated Fatty Acid | 15.20 | 15.15 | 15.15 |
| $NH_4BF_4$ | | 1.54 | 0.68 |
| $Na_2HPO_4$ | | | 1.45 |
| Water | 306.70 | 337.81 | 347.76 |

In embodiments of the invention, synthetic or other type of media fiber can be added to the fiber mixture as well depending on the properties needed in the applications. The mixture can be made during a wetlaid process, to form a web, which then goes through drying, heating or UV cure steps. The web or media or sheet can also be made by other processes such as dry laid processes. In an embodiment, the binder glass (or synthetic) fiber is coated using a solution coating process. Resin-coated inorganic fibers can be made by mixing inorganic fibers with an aqueous solution of a water soluble, noncolloidal cationic (or anionic) thermosetting (or thermoplastic) binder resin to form a dispersion, following which a precipitating agent is added to precipitate the binder resin and coat the fibers. Suitable resin components and processes are also disclosed in U.S. Pat. Nos. 4,523,995 and 7,309,372, the contents of which are incorporated herein by reference in their entirety. The coated fibers can then be used together with or without media fibers, with or without other binder fiber and binder resin, to form a web which is then dried and cured to form a strong and high-performance filter sheet.

Figure 7:
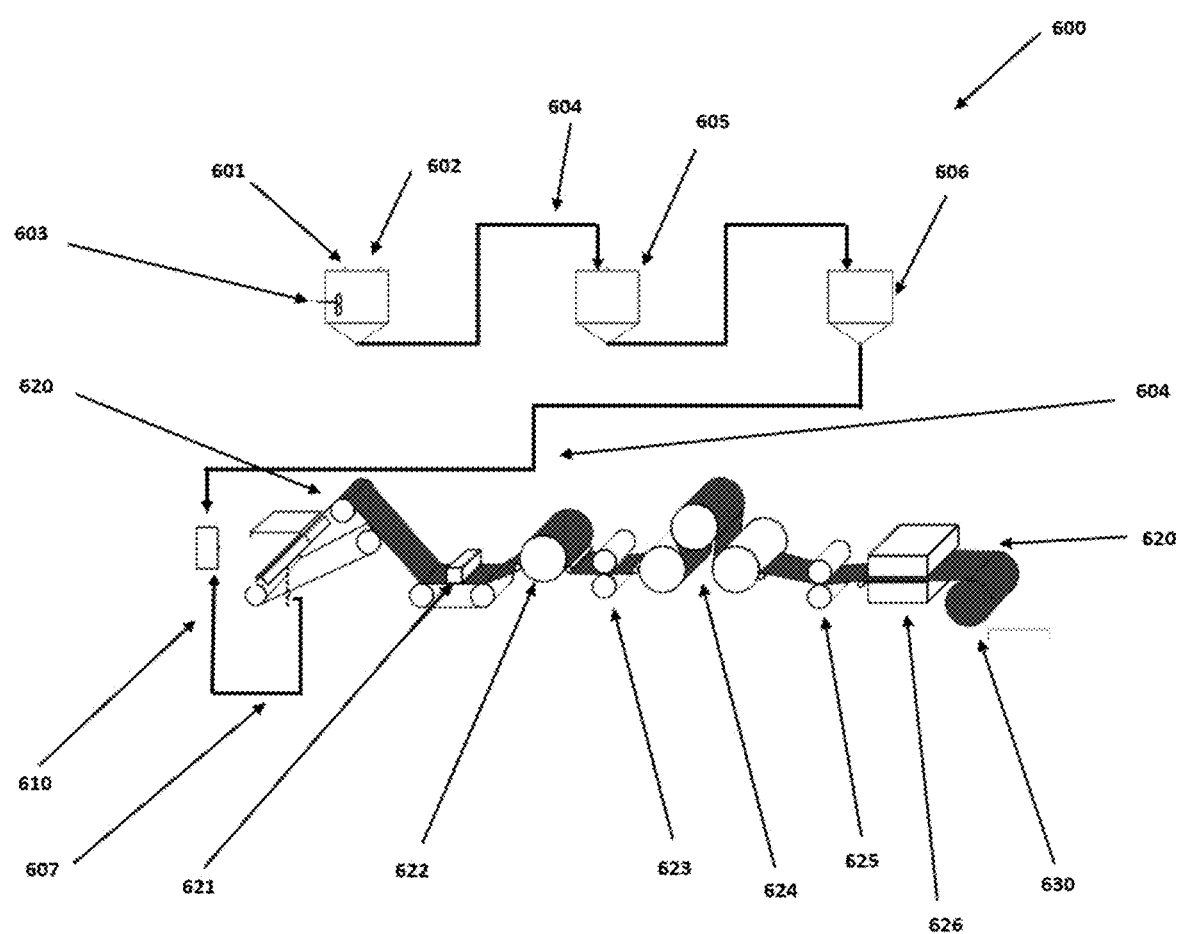
FIG. 7 is a drawing showing an embodiment of a wetlaid media manufacturing process.

In the wetlaid manufacturing process 600 shown in FIG. 7, water 601 and fibers 602 are fed to a pulper 603 which disperses the fibers in water. The liquid stream 604 comprising the fibers and water is then fed to dump chest 605 where the fiber stream can be stored and then metered in controlled amounts to machine chest 606. The fibers are thoroughly mixed inside the machine chest 606 and then the fiber-water stream 604 can be delivered to forming section 607 where the water can be removed to form an initial fiber sheet 620 on the collection web. Excess water 607 removed in the forming section can be recycled for use in the process to keep the solids content of the stream delivered to the forming section within desired levels. From the forming section, the fiber web 620 passes through binder saturator 621 where a binder solution can be applied to the web. The web can then be sent to through dryer 622 to remove excess water. Additional binder saturator 623 and additional can dryers 624 can be used to apply a second binder solution and then dry the fiber web again. Optional corrugator 625 can be used to corrugate the fiber web before being passed through final dryer 626 where the last of the excess water is removed and the binder can be fully activated. The web can then be wound on reel 630 and packaged and stored for further processing.

Filter media comprising the specialty binder fiber can obtain high performance in terms of efficiency, permeability, DHC, and mechanical strength. The specialty binder fibers also can provide improved heat, mechanical, and chemical stability during manufacturing operations as well as during use in the filtration environment. The higher strength and improved bonding from the specialty binder fibers can also reduce fiber shedding and breakage occurrences during manufacturing operations and also during use in the filtration environment. Diameters of the specialty binder fibers can be between 0.1 microns and 20 microns, preferably between 0.1 and 5 microns in some applications. In other embodiments, the diameter of the specialty binder fibers can be between 0.1 micron and 30 microns, preferably between 0.3 microns and 10 microns in some applications. The coating content of the specialty binder fiber can be between 2 percent and 50 percent by weight, preferably between 5 percent and 30 percent by weight in some applications. The content of the specialty binder fibers in the media can be between 5 percent and 100 percent by weight, between 20 percent and 100 percent by weight, between 20 percent and 90 percent by weight, between 10 percent and 80 percent by weight, or between 50 percent and 100 percent by weight. Media fiber content of the media can be between 1 percent and 20 percent by weight, between 1 percent and 50 percent by weight. The diameter of the media fibers can be between 100 microns and 300 microns in some applications. Media fibers can be synthetic fibers, natural fibers, or a blend of the two. Pore size ranges for the media can be between 0.2 microns and 50 microns, preferably between 0.2 microns and 20 microns. If a resin binder is used with the media, the content of the resin binder in the media can be between 0.2 percent and 10 percent by weight, preferably between 0.5 percent and 5 percent by weight in some applications. Filter media can be produce with a thickness between 0.1 mm and 2 mm, a basis weight between 20 grams per square meter and 200 grams per square meter, and a solidity between 5 percent and 25 percent.

Using the parameters described in this disclosure, the following properties for filter media using the specialty binder fibers described in this disclosure can be obtained:
Frazier Permeability: 2-50 fpm (feet per minute)
Burst strength: 5 lb/square inch-30 lb/square inch.
Efficiency@2 um (liquid): up to Beta 10,000
Efficiency 0.3 DOP (air): 50-99.999% at an air velocity of 20 ft/min.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

I claim:

1. A media comprising
a plurality of specialty binder fibers, the specialty binder fibers comprising individually coated inorganic fibers having a surface with a thermally bondable coating, and
a plurality of media fibers wherein the media fibers comprise glass fibers, synthetic fibers, or natural fibers, or a mixture thereof,
a plurality of the specialty binding fibers bonded to a plurality of the media fibers.

2. The media of claim 1 wherein the inorganic fiber of claim 1 is chopped glass fiber.

3. The media of claim 1 wherein the coating comprises a polymer selected from the group consisting of modified polyester, modified polyamide, thermoplastic polymer, and curable resin.

4. The media of claim 1 wherein the coating comprises positively charged materials to enhance filtration efficiency.

5. The media of claim 4 wherein the positively charged materials comprise a polymer selected from the group consisting of epichlorohydrin-functionalized polyamines and epichlorohydrin-functionalized polyamido-amines, and cationically charged polysaccharides.

6. The media of claim 1 wherein the coating comprises negatively charged materials to enhance filtration efficiency.

7. The media of claim 1 further comprising a resin binder wherein the amount of resin binder in the media is between 0.05 percent and 25 percent by weight.

8. The media of claim 1 wherein the diameter of the specialty binder fibers is between 0.1 micron and 30 microns.

9. The media of claim 1 wherein the diameter of the specialty binder fibers is between 0.3 microns and 10 microns.

10. The media of claim 1 wherein the amount of specialty hinder fiber in the media is between 20 percent and 90 percent by weight.

11. The media of claim 1 wherein the diameters of the specialty binder fibers is between 0.05 microns and 30 microns and the amount of specialty binder fibers in the media is between 10 percent and 80 percent by weight.

12. The media of claim 1 wherein the media fibers comprise synthetic fibers wherein the diameter of the media fibers is between 100 microns and 300 microns.

13. The media of claim 1 wherein the media fibers comprise synthetic fibers wherein the amount of media fibers in the media is between 1 percent and 50 percent by weight.

14. The media of claim 7 wherein the resin binder comprises acrylic polymer, methacrylic polymer, vinyl acetate polymer, vinyl chloride polymer, polyvinyl alcohol, polyvinyl acetate, polyvinyl acetyl, polyamide, polyethylene vinyl acetate copolymer, urea phenol resin, urea formaldehyde resin, melamine resin, epoxy resin, polyurethane, curable unsaturated polyester, polyaromatic resins, or resorcinol resins, or mixtures thereof.

15. The media of claim 1 wherein the media has a thickness between 0.1 mm and 2 mm, a basis weight between 20 grams per square meter and 200 grams per square meter, a solidity between 5 percent and 25 percent, and an average pore size between 0.2 micron and 20 microns.

16. The media of claim 1 wherein the media has a Frazier permeability between 1 ft/min and 100 ft/min and an efficiency for 0.3-micron DOP particles between 50 percent and 99.999% at an air velocity of 20 ft/min.

17. The media of claim 1 wherein the media has a burst strength between 5 lbs/square inch and 30 lbs/square inch.

* * * * *